Patented July 30, 1946

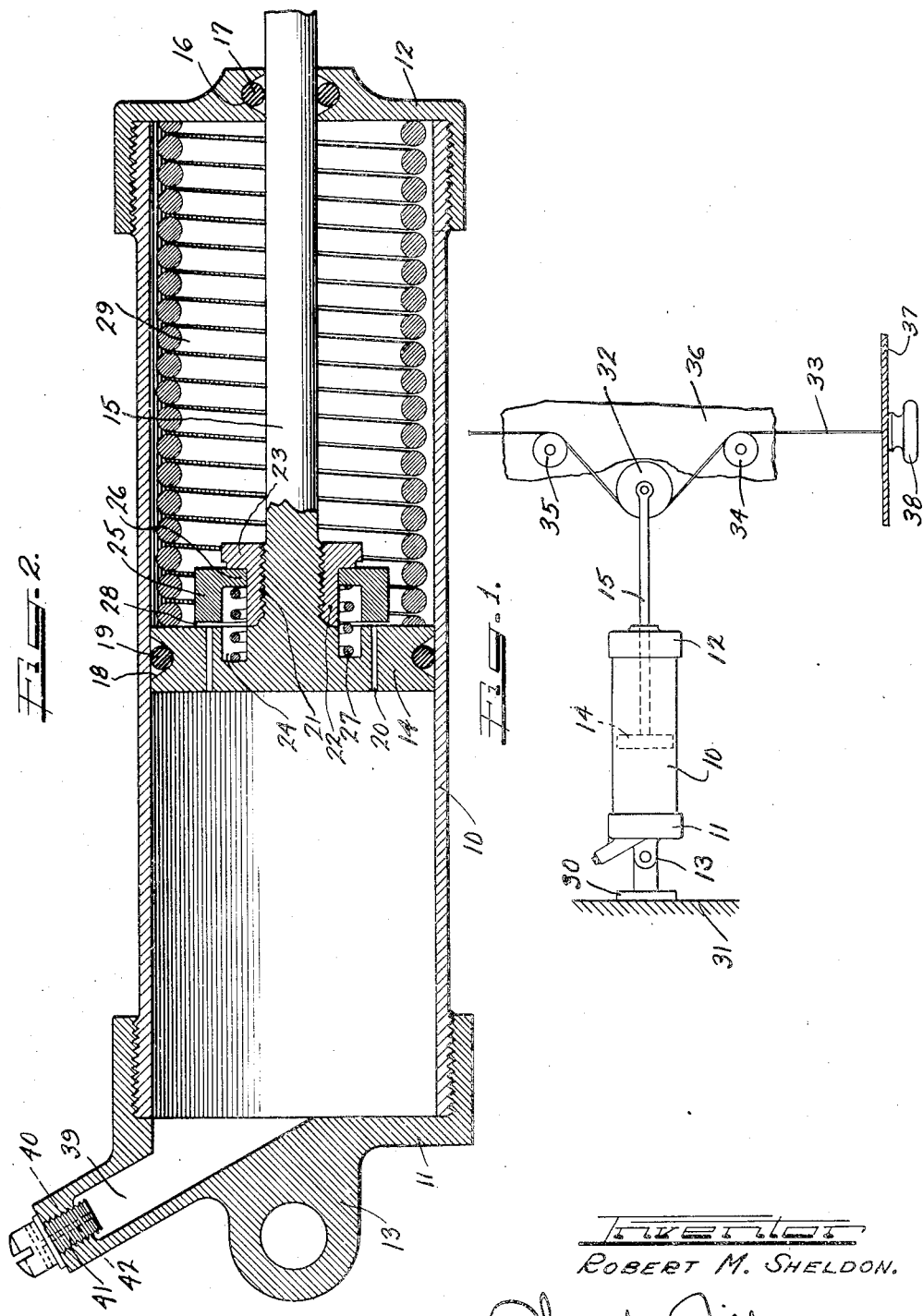

2,405,062

UNITED STATES PATENT OFFICE 2,405,062

CABLE TENSION REGULATOR

Robert M. Sheldon, Los Angeles, Calif.

Application August 25, 1943, Serial No. 500,021

1 Claim. (Cl. 267—1)

My invention relates to cable tension regulators for maintaining predetermined tension in cables to compensate for changes in cable length under temperature variation while the cables are idle, but which are hydraulically locked out when the cables are operated for setting of some control element.

My invention may be efficiently utilized where cables are comparatively long and extend through structures the coefficient of expansion of which is materially different from that of the cables. My invention is particularly useful in aircraft structures where cables extend from control devices in the cockpit through the fuselage or wings to flying control elements to be operated.

An important object of the invention is to provide a hydraulically controlled tension regulator for association with cables comprising a cylinder with a piston therein engaged by a spring so that tension will be exerted on a cable to be controlled associated with the end of the piston rod extending from the piston, and with valving mechanism associated with the piston structure for control of the flow from one side of the piston to the other.

A further object is to provide valving mechanism controlled entirely hydraulically by the fluid within the cylinder with the operation such that, when the cable is idle, the flow passageway is such that the piston may move comparatively slowly back and forth under varying temperature conditions to maintain the spring tension on the cable, but with quick closure of the fluid passageway when the cable is suddenly operated so that the piston will be hydraulically locked against further outward movement after slight outward movement thereof when the cable operation is started.

The structure shown on the accompanying drawing embodies the various features of my invention, and on the drawing:

Figure 1 is a more or less diagrammatic illustration of one manner of application of a tension regulator for control of a cable; and Figure 2 is a longitudinal diametral section of the regulator.

Referring to Figure 2, the tension regulator comprises a cylinder body 10 having the cylinder heads or caps 11 and 12 secured to the ends thereof as by threading, the head 11 being provided with ears 13 for attachment of the cylinder structure to a suitable support. Within the cylinder is the piston 14 from which extends the piston rod 15 for passage at its outer end through the head 12 in which the circumferential channel 16 holds packing material 17 for sealing against leakage. The piston has the circumferential channel 18 containing suitable packing so as to provide a seal for preventing flow of fluid between the piston and the cylinder wall.

Extending transversely through the piston 14 equidistant from the piston axis are comparatively restricted flow passages 20. Adjacent to the outer side of the piston, the piston rod 15 is threaded as indicated at 21 for receiving a bushing 22 having the flange 23 at its outer end. The bushing flange is opposite the annular groove 24 in the piston and the flange provides abutment for the annular valve 25 from whose outer end extends the flange 26 for receiving the bushing 22. The valve flange is opposed to the annular groove 24 in the piston, and a compression spring 27 seated against the bottom of the groove abuts at its outer end the valve flange 26 and tends to hold the valve against the bushing flange 23. The inner end of the valve 25 is in a diametral plane and is opposed to the flow passageways 20 through the piston, and when the valve is held out by the spring against the bushing flange 23, the end of the valve will be away from the inner side of the piston to leave the comparatively narrow restricted annular flow passageway 28. When the valve is shifted against the piston, this annular passageway 28 and the piston passageways 20 will be closed against fluid flow, the cylinder being filled with fluid, such as oil.

A compression spring 29 within the cylinder abuts at its inner end against the piston outside of the valve 25 and at its outer end abuts the cylinder head 12, this spring tending at all times to shift the piston and piston rod inwardly in the cylinder.

Referring to Figure 1, one manner of connecting the tension regulator in service is more or less diagrammatically illustrated. By its ears 13, the cylinder is fulcrumed to a suitable fitting 30 mounted on a stationary frame 31 which may be part of an airplane framework. The piston rod at its outer end journals a jockey pulley 32 engaging a cable 33 whose tension is to be regulated. The jockey pulley is located between pulleys 34 and 35 journaled on a stationary support 36 which may be part of the airplane framework. One end of the cable 33 may extend to a control panel 37 for connection with a suitable pull control 38. The other end of the cable may extend a considerable distance through the airplane fuselage or the wings for connection with a flight controlling member on the airplane, such as a rudder (not shown).

Cables are usually of metal such as steel, and where the airplane framework, through which the cable extends, is of metal such as aluminum, the difference in coefficients of expansion may result in considerable lengthening or shortening of the cable during temperature variation. When the tension regulator is installed for control of a cable, the piston is outwardly a distance in the cylinder, usually near the center thereof, for contraction of the spring 29 for the desired tension on the cable. Now, when the cable is idle, slackening of the cable due to temperature change will be comparatively slowly taken up by the expansion of the spring 29, and contraction of the cable during temperature variation will pull out the piston against the resistance of the spring 29. During such comparatively slow movement of the piston due to variation in length of the cable under temperature variation, the valve spring 27 will hold the valve open for exposure of the flow passageway 28 between the valve and the piston, and the valve flow passageways 26. Thus upon comparatively slow outward movement of the piston in response to cable shortening under temperature change, fluid may flow from the outer end of the cylinder through the exposed passageways to the inner end of the cylinder, and upon retraction of the piston by the spring the flow will be in the opposite direction. However, should the cable 33 be pulled by operation of the control 38, such tensioning of the cable will tend to pull the piston out comparatively rapidly so that the oil in the outer part of the cylinder cannot quickly escape through the passageways 28 and 29, and oil pressure will be quickly built up in the outer end of the cylinder which acts against the valve to shift it on the bushing 22 for closure of the passageways 28 and 29, and the piston will then be substantially instantly hydraulically locked against outward movement so that the control of the cable by the operator will be independent of movement of the jockey pulley 32, and efficient control of the respective flight controlling structure will be assured without any material lost motion. As soon as the operator releases the control, the tension regulator will take over and maintain the cable tension during temperature variation. Closure of the valve 25, to establish the hydraulic lock when a cable is operated, is automatically accomplished hydraulically.

The volume of oil in the cylinder may increase or decrease during temperature change, and the volumetric capacity of the cylinder may increase or decrease as the piston rod moves inwardly and outwardly in the cylinder. I therefore preferably provide an expansion chamber 39 which may be located in the extension 40 on the cylinder head 11. The outer end of this chamber is normally closed by a removable filler plug 41 and this plug has the passageway 42 therethrough to the exterior. As the level of the oil in this expansion chamber rises or falls, air may escape from the chamber 39 or flow back thereinto.

The tension regulator can be associated with cables in various ways. Instead of anchoring the cylinder at one end and connecting the piston by jockey pulley with a cable as shown on Figure 1, the regulator could be included directly serially in the cable.

I have shown practical and efficient embodiments of the features of my invention but I do not desire to be limited to the exact structural arrangement and operation shown and described as changes and modifications may be made without departing from the scope of the invention as defined in the appended claim.

I claim as follows:

In an aircraft, a tension regulator for regulating the tension of a cable extending to a control in the aircraft, comprising a closed hydraulic fluid filled cylinder connected with a support, a piston within the cylinder having a rod extending therefrom to the exterior and having engagement with the cable to be regulated, a compression spring in the outer end of the cylinder in engagement with the piston tending to move said piston for tensioning of the cable, said piston having restricted capillary passageway therethrough for flow of fluid from one side of the piston to the other as the piston moves in the cylinder, an outer flat face on said piston affording a solid area surrounding the capillary passageway with a solid area to a substantial extent in all directions in the plane of said face, an annular valve surrounding the piston rod having an inner flat annular face parallel with the outer flat face of said piston in front of and opposing the mouth of said restricted passageway through the piston, said inner flat valve face opposing an area of said outer flat piston face several times as great as the passageway cross-sectional area, an abutment on the piston rod for said valve, a valve spring normally holding said valve against said abutment to leave only a narrow flow restricting capillary gap between said inner face of the valve and the piston and being spaced a substantial radial distance from said passageway and with substantial area of the opposed flat faces intervening, said valve spring being comparatively light in order to hold said valve open for flow through said restricted gap and piston passageway only during comparatively very slow movement of the piston in response to variation in length of the cable under temperature changes, whereby said piston may move outwardly in response to temperature contraction of the cable and said compression spring may move said piston inwardly in response to temperature expansion of the cable to keep said cable under tension, and whereby upon control operation pull on the cable and piston the low rate of flow through said capillary gap and passageway will substantially immediately cause the pressure in the outer end of the cylinder to close the valve by bringing said opposed flat face areas into abutment to seal the passageway against fluid flow for hydraulic lock of the piston against any material outward movement thereof while the pull thereon is maintained.

ROBERT M. SHELDON.